United States Patent [19]

Mattern

[11] 4,032,714
[45] June 28, 1977

[54] PCM TIME DIVISION MULTIPLEX COMMUNICATION NETWORK WITH DIGITAL SUBSCRIBER STATIONS

[75] Inventor: Alfred Mattern, Grobenzell, Germany

[73] Assignee: Siemens Aktiengesellschaft, Munich, Germany

[22] Filed: June 25, 1976

[21] Appl. No.: 699,957

[30] Foreign Application Priority Data
June 27, 1975 Germany .......................... 2528840

[52] U.S. Cl. ..................... 179/15 BA; 179/15 AP; 179/15 AL
[51] Int. Cl.² .......................................... H04J 3/06
[58] Field of Search ...... 179/15 BA, 15 AP, 15 BS, 179/15 AL, 15 AD, 15 AE

*Primary Examiner*—Thomas A. Robinson
*Attorney, Agent, or Firm*—Gerald L. Lett

[57] ABSTRACT

A PCM time division multiplex communication network is disclosed having a central processing office and digital subscriber stations. A special code word is prefixed to the PCM data sent by the central processing office to designate the intended subscriber station. While only the designated subscriber station is capable of accepting the PCM data, other subscriber stations are capable of amplifying and passing on the PCM data to the next subscriber station. Specifically, the invention is directed to a method and apparatus for transmitting PCM data wherein no special means are provided in the subscriber stations for synchronization while at the same time no increase in the bandwidth of the transmission signal is necessary. This is accomplished by using the PCM data accepted by a subscriber station as the carrier for the output information of the subscriber station. In addition, the PCM data transmitted from the central processing office is characterized by bits of varying amplitude and width which permit the subscriber stations to derive the timing signal directly from the PCM data.

16 Claims, 3 Drawing Figures

PCM TIME DIVISION MULTIPLEX COMMUNICATION NETWORK WITH DIGITAL SUBSCRIBER STATIONS

BACKGROUND OF THE INVENTION

This invention relates to a method and apparatus for operating a PCM time division multiplex communication network having digital subscriber stations. Pursuant to the invention, the subscriber stations accept PCM data sent from a central processing office which designates the particular subscriber station intended to receive the PCM data. The designation of a particular subscriber station is accomplished by a special code word sent from the central office and prefixed to the outgoing PCM data.

This special code word may be the address of the subscriber station (for example, P 2 341 115) or—in the case of a switching process wherein the subscriber stations are connected in a defined sequence to a common time division multiplex line and wherein the PCM data are transmitted from the central office in the same sequence in which the subscriber stations are located on the time division line—it may be a head code word which, upon being received for the first time within a sampling pulse frame, results in the acceptance of the PCM data.

Under both these methods, the special code word is used to introduce an information signal to the subscriber stations. This information signal is a bit group which normally comprises the PCM data transmitted from the central office and a group of unmodulated bits likewise transmitted from the central office. This group of unmodulated bits, which may be provided before or after the PCM data, normally serves as a carrier bit group for the modulators of the subscriber stations. By using these unmodulated bits in conjunction with the PCM data, no special synchronization is required to operate the modulators in the subscriber stations.

This method of incorporating unmodulated bits in the information signal together with the PCM data requires use of broadband transmission media. For example, the transmission media might be glass fiber paths for use with information carrying laser beams. The use of such transmission media usually solves the bandwidth requirements imposed by this technique of transferring an unmodulated bit group as long as only one type of data is to be transferred (e.g. telephone data). If, however, in one and the same system, additional data other than telephone data is to be transmitted, such as, for example, broadcast data or television data in conjunction with the video, traffic may be impeded. For these multiple data systems, a bottleneck is likely to occur if a large number of subscriber stations are connected. This bottleneck will occur even if broadband transmission media such as glass fiber paths are used.

SUMMARY OF THE INVENTION

In view of the transmission problems discussed above which exist in present PCM multiplex communication networks, it is an object of this invention to set forth a method and apparatus for conveniently handling different types of data in a communication system using existing transmission media. The invention disclosed herein is a PCM time division multiplex communication network having digital subscriber stations wherein, as in the techniques described above, no special means are needed in the subscriber stations for synchronization, while at the same time no increase in the bandwith is required.

In accordance with the invention, the above and other objects are achieved by providing the PCM data transmitted from the central office with special signal characteristics. The width of each bit in the PCM data is clearly defined by jumps of set physical quantities. In addition, the PCM data accepted by a subscriber station is not only sent to a demodulator but is also sent to a modulator to be used as a carrier bit group for the output data.

The special signal characteristics employed in accordance with the teachings of the invention are used to derive directly the bit timing signal from the incoming PCM data in the subscriber stations. It must not, as is otherwise customary, be extracted via complex regeneration circuits which incorporate, for example, an adjustable clock generator and a phase comparator. Thus, the PCM data which in accordance with the invention are also fed to the modulator may be used directly as a carrier bit group for the output information of the subscriber station. The transmission of an ummodulated bit group in accordance with the principles of the above mentioned known methods can be eliminated. As a result, good economy of bit bandwidth is achieved.

The special signal characteristics of the PCM data which permit the direct extraction of the bit timing signal therefrom can be realized in different ways. For example, current pulses of varying amplitudes or different polarities can be used to represent the information bits. When glass fiber paths are used as a transmission medium and laser beams as an information medium, light pulses of two different intensities may be employed to represent the information bits. Also, two linearly polarized laser beams perpendicular to each other or a clockwise and a counterclockwise circularly polarized laser beam may likewise be employed to represent the information bits.

DETAILED DESCRIPTION OF THE INVENTION

Figure 1:
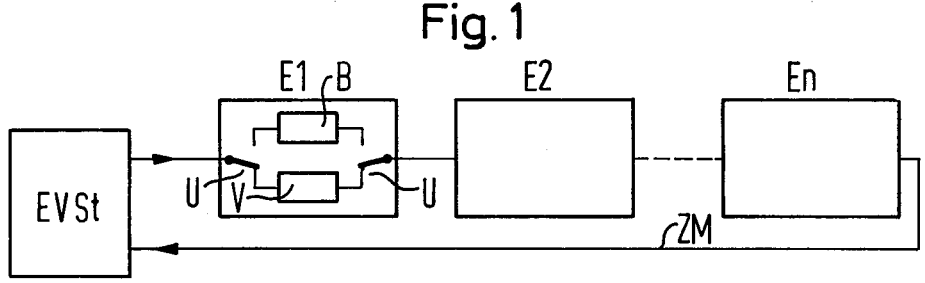
FIG. 1 shows a schematic diagram of the part of a PCM time division communication network to which the invention is directed.

FIG. 1 shows the part of a PCM time division multiplex communication network in the region of a terminal exchange (EVSt). The subscriber stations (E1) to (En) of this time division multiplex communication network are connected by a time division multiplex line (ZM) to the terminal exchange (EVSt) in a ring configuration. The subscriber stations (E1) to (En) are designed to accept data from the information flow which is designated by the terminal exchange (EVSt) through use of a special code word as intended for such subscriber stations. In this case, the subscriber stations (E1) to (En) transmit additional information to the continuing part of the time division multiplex line. When PCM data is not intended for a particular subscriber staion, the subscriber stations (E1) to (En) amplify and pass the PCM data without modification.

This operating mode of the subscriber stations is shown in FIG. 1 in subscriber station E1 by the presence of an amplifier (V), a processing part (B) and two switches (U). Either the amplifier (V) or the processing part (V) is connected to the time division multiplex line (ZM).

In the preferred embodiment described herein, it is assumed that the special code word prefixed to the PCM data transmitted by the terminal exchanges (EVS$t$) is the address of the subscriber station for which the information is intended. Thus, the operation of the time division multiplex communication network of the preferred embodiment uses addresses (for example, P 2 341 115) rather than a head code word as in a sequencing system.

Figure 3:
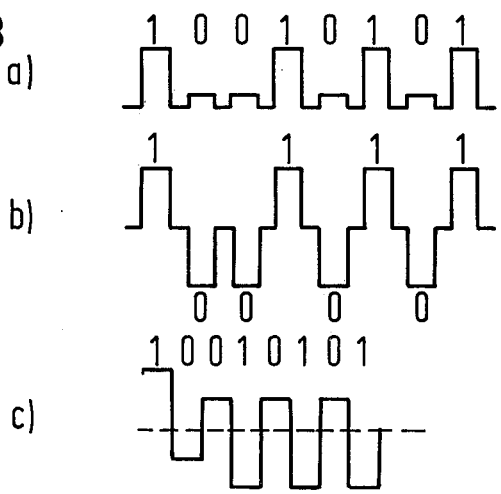
FIG. 3 shows three examples of the special signal characteristics of the PCM data employed by this invention.

The PCM data transmitted over the time division multiplex line ZM have special signal characteristics wherein the width of each bit is clearly defined by jumps of set physical quantities. FIG. 3 shows three examples of such signal characteristics. As shown in FIG. 3$a$, to represent the 8-bit PCM word 10010101, a signal representation is used wherein the binary symbol 1 is represented by a current pulse of a high amplitude and the binary symbol 0 by a current pulse of a much lower amplitude in comparison thereto, with the current value between adjacent bits falling to zero. In this way, the widths of the individual bits will clearly be defined even if several binary symbols 1 or symbols 0 follow one another. Thus, the bit timing signal can be extracted from such a PCM word without special synchronization means. The same result is achieved by the representation of FIG. 3$b$ wherein the symbol 1 is represented by a positive current pulse and the symbol 0 by a negative current pulse. Another more intensive example which also achieves an operationally stable exploitation of the transmission spectrum is shown by the signal representation in FIG. 3$c$. In this example, adjacent bits are always represented with opposite polarity or with varying polarization and the symbols 1 and 0 again are expressed by current pulses of different amplitudes. With this example, it is no longer necessary that the signal return to zero amplitude between two successive bits; in this way, even more efficient use is made of the available transmission spectrum while the bit widths are still defined by jumps of set physical quantities.

Figure 2:
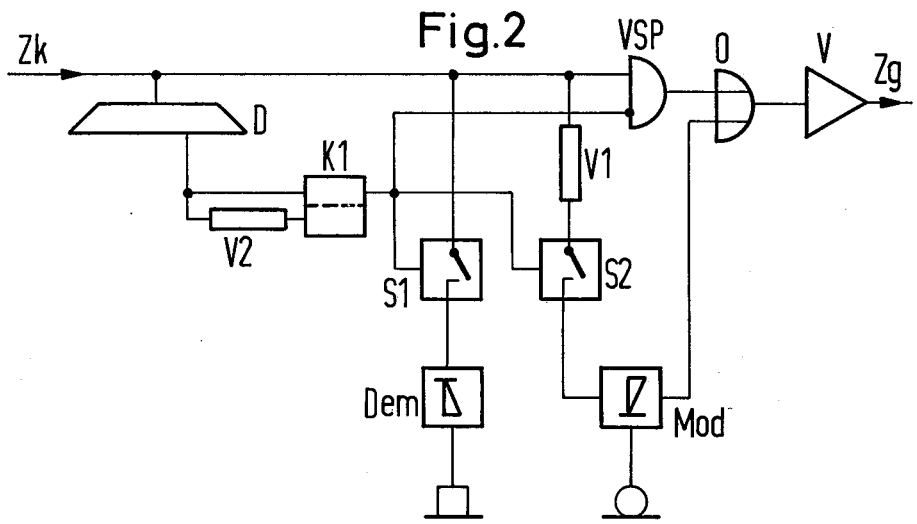
FIG. 2 details a subscriber station of the time division multiplex communication network of FIG. 1.

To further explain the method and apparatus according to the invention reference is made to FIG. 2 wherein it is assumed, first, that in the subscriber station shown therein an information signal arrives which contains the address of another subscriber station together with a unit of PCM data. In this case, the information signal supplied over the incoming line (Z$k$) is passed directly through to gate element (VSP), to OR element (0) and the amplifier (V) of said subscriber station from where it is retransmitted over line (Z$g$) of the subscriber station.

If, however, the address of the information signal which arrives at the subscriber station is the address of the subscriber station under consideration, then an address decoding occurs by means of the decoder (D) which then supplies an output signal setting the trigger element (K1). By means of the output signal of the trigger element (K1) the two switches (S1) and (S2) are closed; at the same time, a reverse potential is applied to the gate element (VSP).

Because of the existence of a reverse potential at gate element (VSP), the PCM data contained in the information signal cannot be passed through to the output (Z$g$) of the time division multiplex line. Instead, the PCM data travels from the incoming time division multiplex line (Z$k$) through the closed switch (S1) to the demodulator (D$em$) for demodulation.

By means of the closed switch (S2) a circuit is also established between the modulator (M$od$) and the incoming time division multiplex line (Z$k$). However, due to the delay encountered in delay element (V1) — the delay time of the delay element (V1) corresponds to the period of a PCM word—located between the time division multiplex line and the switch (S2) the PCM data information which follows the address is only available at the modulator after the demodulation process is completed. The modulator (M$od$) is then actuated to transfer the output information of the subscriber station to the information carrier. In the operation of this preferred embodiment, as in the methods described hereinbelow, no special means are required for pulsing the modulator and, in addition, unlike the prior art methods there is no separate transmission by the central office of an unmodulated bit group following the PCM data of the information signal.

The PCM information produced by the modulator (M$od$) is sent through the OR element (0) to the amplifier (SV) and the outgoing time division multiplex line (Z$g$). Since this PCM information does not contain an address, it passes all the following subscriber stations and amplifiers (V) thereof, finally returning to the terminal exchange (EVS$t$).

The address decoder (D), in addition to actuating trigger element (K1) upon receipt of an information signal with the accepted address for the subscriber station, actuates the delay element (V2). This delay element (V2) is used to reset the trigger element (K1). The delay time of the delay element (V2) is such that after the time period for two PCM words, the trigger element (K1) receives a reset signal, whereupon the two stitches (S1) and (S2) are reopened and the reverse potential is removed from the inhibiting input of the gate element (VSP). In this manner, the subscriber station illustrated in FIG. 2 returns to its original state and functions for subsequently incoming information signals which contain the address of other subscriber stations or other PCM data without a preceding address.

I claim:

1. A method for operating a PCM time division multiplex communication network having a central processing office and digital subscriber stations, the steps of the method comprising:

generating an information signal in the central processing office which contains a special code word prefixed to the PCM data whereby said special code word is used to designate a particular subscriber station intended for acceptance of the PCM data;

impressing upon the PCM data portion of said information signal in the central processing unit a special signal characteristic comprising bits which have widths clearly defined by jumps of set physical quantities, whereby said special signal characteristic is used to derive directly the timing signal of the designated subscriber station;

sending said information signal from the central processing unit to the designated subscriber station for demodulation therein of the PCM data, said designated subscriber station using the special signal characteristic of the PCM data to derive directly its timing signal;

feeding the PCM data accepted by the designated subscriber station to the modulator contained therein, whereby the PCM data is used as a carrier bit group for the output information of the subscriber station;

transmitting the output signal of the designated subscriber station to the central processing office.

2. The method according to claim 1 further comprising the steps of:

connecting said digital subscriber stations to said central processing office in a ring fashion whereby information signals generated by said central processing office successively pass through each subscriber station;

retransmitting said information signal without modification in subscriber stations which are not designated by said special code word to accept the PCM data.

3. The method according to claim 1 in which said special signal characteristic is represented by information bits containing pulses of different amplitudes.

4. The method according to claim 1 in which the special signal characteristic is represented by information bits containing pulses of different polarities.

5. The method according to claim 1 in which the special signal characteristic is represented by information bits containing two linearly polarized laser beams perpendicular to each other.

6. The method according to claim 1 in which the special signal characteristic is represented by information bits containing a clockwise and a counter-clockwise circularly polarized laser beam.

7. The method according to claim 1 in which the special signal characteristic is represented by information bits containing pulses of different amplitudes and polarities.

8. A PCM time division multiplex communication network having a central processing office and a plurality of digital subscriber stations comprising:

means within the central processing office for generating an information signal, said information signal containing a special code word prefixed to the PCM data, whereby said special code word is used to designate a particular subscriber station intended for acceptance of the PCM data, said information signal further containing a PCM data portion having a special signal characteristic comprising bits which have widths clearly defined by jumps of set physical quantities, whereby said special signal characteristic is used to derive directly the timing signal of the designated subscriber station;

means within each subscriber station for retransmitting information signals which are not intended for said subscriber station, whereby said information signal is retransmitted without modification;

decoder means within each subscriber station for actuating said subscriber station in response to an information signal intended for said subscriber station, whereby said decoder means is responsive to the special code word of said information signal;

demodulation means within each subscriber station for demodulating the PCM data portion of said information signal, whereby the timing signal for said demodulation means is derived directly from said special signal characteristic of the PCM data portion of said information signal;

modulation means within each subscriber station for generating the output signal of said subscriber station, whereby said modulation means uses the PCM data portion of the information signal as a carrier bit group for the output signal of said subscriber station.

9. A PCM time division multiplex communication network according to claim 8 in which said special signal characteristic is represented by information bits containing pulses of different amplitudes.

10. A PCM time division multiplex communication network according to claim 8 in which said special signal characteristic is represented by information bits containing pulses of different polarities.

11. A PCM time division multiplex communication network according to claim 8 in which said special signal characteristic is represented by information bits containing two linearly polarized laser beams perpendicular to each other.

12. A PCM time division multiplex communication network according to claim 8 in which said special signal characteristic is represented by information bits containing a clockwise and a counter-clockwise circularly polarized laser beam.

13. A PCM time division multiplex communication network according to claim 8 in which said special signal characteristic is represented by information bits containing pulses of different amplitudes and polarities.

14. A PCM time division multiplex communication network according to claim 8, further comprising:

trigger means within each subscriber station for actuating said demodulation means and said modulation means in response to the presence of the special code word in said decoder means, whereby said trigger means further blocks said retransmitting means to prevent retransmission of an information signal designated for said subscriber station.

15. A PCM time division multiplex communication network according to claim 14, further comprising:

first delay means connected to the input of said modulation means for delaying the transmittal of the PCM data portion of said information signal to said modulation means, whereby said PCM data portion of said information signal is transmitted to said modulation means after completion of the demodulation in said demodulation means;

second delay means connected to said trigger means for resetting said trigger means upon completion of demodulation by the demodulation means and modulation by the modulation means, whereby said trigger means is prevented from blocking said retransmitting means.

16. A PCM time division multiplex communication network according to claim 15 wherein said retransmitting means further comprises amplifier means connected to the output of the subscriber station for amplifying information signals not intended for said subscriber station and for amplifying output signals generated by the modulation means of said subscriber station.

* * * * *